United States Patent [19]

Jeskey

[11] Patent Number: 4,669,813

[45] Date of Patent: Jun. 2, 1987

[54] FACEPLATE INCORPORATING AN OFF-AXIS FILTER

[75] Inventor: Richard V. Jeskey, Fiskdale, Mass.

[73] Assignee: Incom, Inc., Southbridge, Mass.

[21] Appl. No.: 636,609

[22] Filed: Aug. 1, 1984

[51] Int. Cl.[4] .................... G02B 6/00

[52] U.S. Cl. .................... 350/96.10; 350/96.27; 350/276 SL; 350/319

[58] Field of Search .................... 350/96.10, 96.15, 96.27, 350/96.30, 96.33, 96.34, 276 SL, 320, 448, 319

[56] References Cited

U.S. PATENT DOCUMENTS

| | | | |
|---|---|---|---|
| B 532,969 | 1/1976 | Strack | 350/96.26 |
| 3,335,310 | 8/1967 | Ney | 350/96.27 X |
| 3,549,233 | 9/1967 | Eaglesfield et al. | 350/96.33 |
| 3,797,910 | 3/1974 | Westwig | 350/96.27 |
| 4,344,668 | 8/1982 | Gunther et al. | 350/276 SL X |
| 4,406,973 | 9/1983 | Stowe | 313/541 |
| 4,475,059 | 10/1984 | Sink | 350/276 SL X |
| 4,533,210 | 8/1985 | Jeskey | 350/96.30 |

FOREIGN PATENT DOCUMENTS 2477288 4/1981 France .

OTHER PUBLICATIONS

Johnson et al., "Thin Fiber-Optic Face Plate Cathode-Ray Tube", *IBM Technical Disclosure Bulletin*, vol. 14, No. 8 (Jan. 1972), pp. 2486-2487.

*Primary Examiner*—John Lee

*Attorney, Agent, or Firm*—Norman S. Blodgett; Gerry A. Blodgett

[57] ABSTRACT

A faceplate for a highly sensitive low-light level imaging device is provided with an off-axis light filter to reduce optical noise. A transparent optical conduit layer includes an absorbing region around the periphery to absorb off-axis light. A transparent front plate extends beyond the periphery of the conduit and forms a shoulder of easily polished glass to facilitate the sealing of the faceplate to the imaging device frame. A clear glass back plate extends so as to cover the entire inner surface of the conduit including the absorbing region, thereby providing an easily and consistently polishable surface upon which to bond a photosensitive semi-conductor wafer. This reduces the necessity for matching of glass compositions between the core and the absorbing region. The absorbing region may be a toroidal area of black glass or it may be composed of a matrix of glass having the same composition as the rest of the faceplate but having absorbing glass fibers embedded more or less radially of the axis of the conduit. In the latter case the need for glass matching is virtually eliminated.

7 Claims, 7 Drawing Figures

Fig. 1
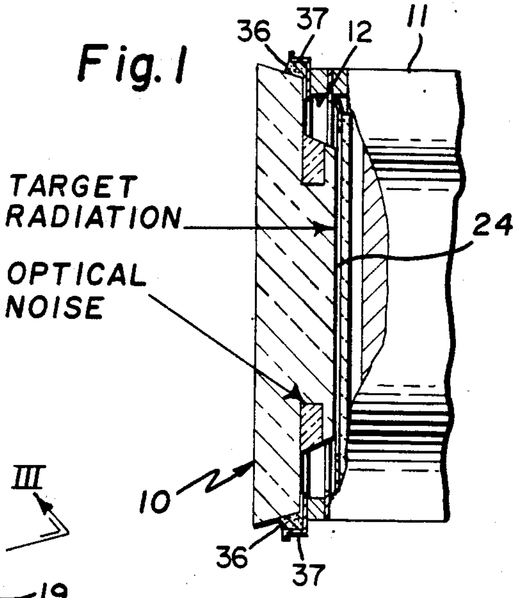
Fig. 2
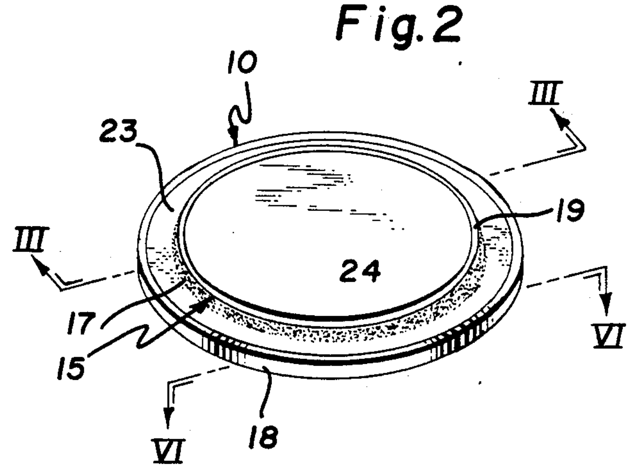
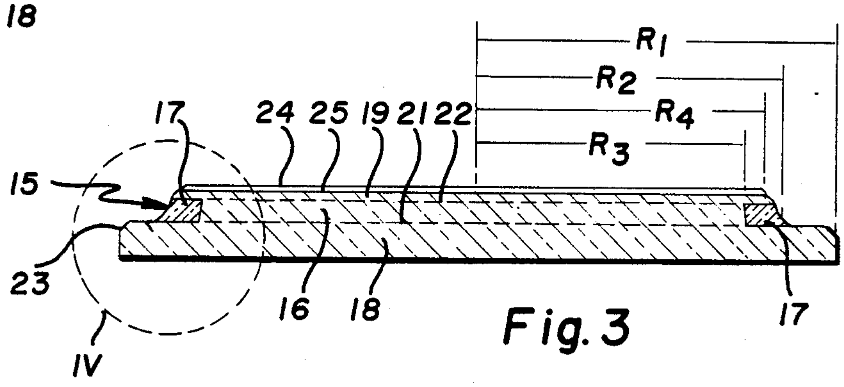
Fig. 3
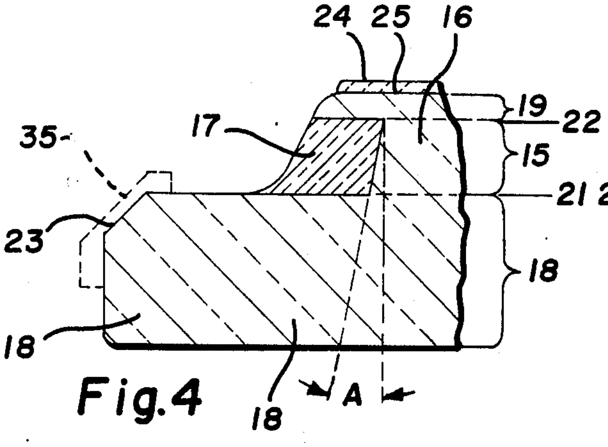
Fig. 4
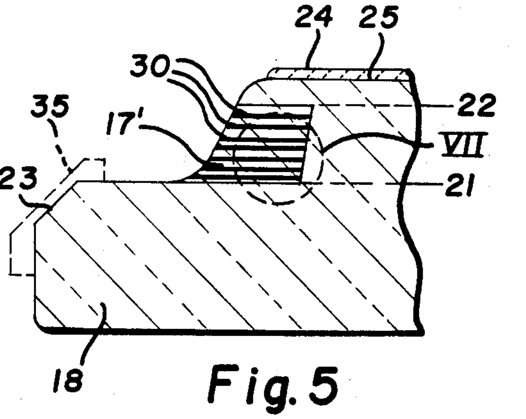
Fig. 5

FACEPLATE INCORPORATING AN OFF-AXIS FILTER

BACKGROUND OF THE INVENTION

This invention involves highly sensitive optical detection/imaging devices designed for use in low light level applications or applications involving relatively high ambient optical noise. For such applications, a goal is to limit the effects of radiation propagating obliquely to axis of the device. This off-axis radiation includes ambient optical noise, as well as target light scattered by the entrance conduit of the device itself. A solution to this problem has been to provide a device having a window or conduit whose periphery absorbs off-axis radiation. This solution involves the provision of a peripheral region of absorbing medium such as black glass. In some applications, it has been found preferable, in lieu of a solid black absorbing region, to provide a peripheral region of glass having the same composition as a transparent core, and containing light absorbing fibers extending more or less radially of the axis of the conduit. Details of such a filtering conduit are disclosed in co-pending patent application Ser. No. 497,865, U.S. Pat. No. 4,533,210.

Prior conduits of this class have been manufactured as a simple cylinder of transparent medium completely surrounded by a thick layer of absorbing medium (black glass.) In such a conduit the absorbing medium is further extended radially at the outer face to serve as a contact stop along the periphery of the aperture of the frame of the detecting device. At the same time this extension provides a seat for the sealing of the conduit or faceplate to the frame of the optical imaging device. The primary light detecting component, usually a light-sensitive semi-conductor wafer, is sealed to the inner surface of the conduit and extends out over the absorbing layer as well.

The shoulder of the outer extended portion of the completed filter, which is to be aligned and sealed with a seat on the device frame, must be carefully polished to assure a consistently secure seal. The inner surface of the conduit must also be precisely polished to assure consistent bonding of the semi-conductor wafer. The polishing and sealing of the shoulder and the application of the wafer have hitherto produced inconsistent bonds. It has been found that some of the inconsistency is due to the relative difficulty of polishing the material making up the absorbing region, as compared with clear glass. These and other difficulties are also related to the differing coefficients of thermal expansion between absorbing glass and clear glass. Although these coefficients can be matched for a narrow temperature range, it is difficult to match them both for the operating temperature of the device and also for the temperature required for manufacture. The difficulty of polishing the absorbing medium makes the attainment of a proper seal at the shoulder of such material difficult. Furthermore, the inner surface of the conduit, where the detecting material is located, is inconsistently polished, producing inconsistent bonding of the semi-conductor wafer. The present invention obviates these and other difficulties of the prior art devices in a novel and unobvious ways.

It is, therefore, a primary object of the present invention to provide a faceplate for an optical imaging device which displays off-axis filtering capacity while allowing precise polishing at critical sealing surfaces.

Another object of the present invention is to provide a conduit for an optical detection device which displays off-axis filtering capability while presenting a homogeneous surface for the application of the semi-conductor detection element.

A further object of the present invention is the provision of a faceplate incorporating an off-axis filter which minimizes the need for careful matching of the coefficients of thermal expansion of the clear and absorbing regions respectively.

Another object of the present invention is to provide an off-axis filter which is simple in construction, economical to manufacture, and capable of a long life of useful service with a minimum of maintenance.

With these and other objects in view, as will be apparent to those skilled in the art, the invention resides in the combination of parts set forth in the specification and covered by the claims appended hereto.

SUMMARY OF THE INVENTION

The present invention involves a faceplate for an optical imaging device which incorporates an off-axis filter, the faceplate comprising an optical conduit layer in which the peripheral light absorbing region is isolated from parts of the conduit which require especially precise polishing and which presents a homogeneous inner surface for interface with the detecting element. More specifically, the invention comprises a conduit including a transparent core and an absorbing region around the periphery of the core, a transparent front plate having a non-reflecting, non-refracting interface with the front surface of the conduit core and extending radially beyond the conduit periphery. The invention also involves a transparent back plate having a non-reflecting, non-refracting interface with the conduit core and extending radially beyond the periphery of the core; preferably extending up to the periphery of the conduit as a whole.

BRIEF DESCRIPTION OF THE DRAWINGS

The character of the invention, however, may be best understood by reference to one of its structural forms, as illustrated by the accompanying drawings, in which:

FIG. 1 illustrates a generalized imaging device including a faceplate as disclosed hereinunder, FIG. 2 is a perspective view of an embodiment of the faceplate of the present invention, FIG. 3 is a section taken on line III—III of FIG. 2, FIG. 4 is a detailed view of the region labeled IV in FIG. 3, FIG. 5 is a detail, for an alternative embodiment, of the area labeled IV in FIG. 3.

DESCRIPTION OF THE PREFERRED EMBODIMENT

Figure 6:
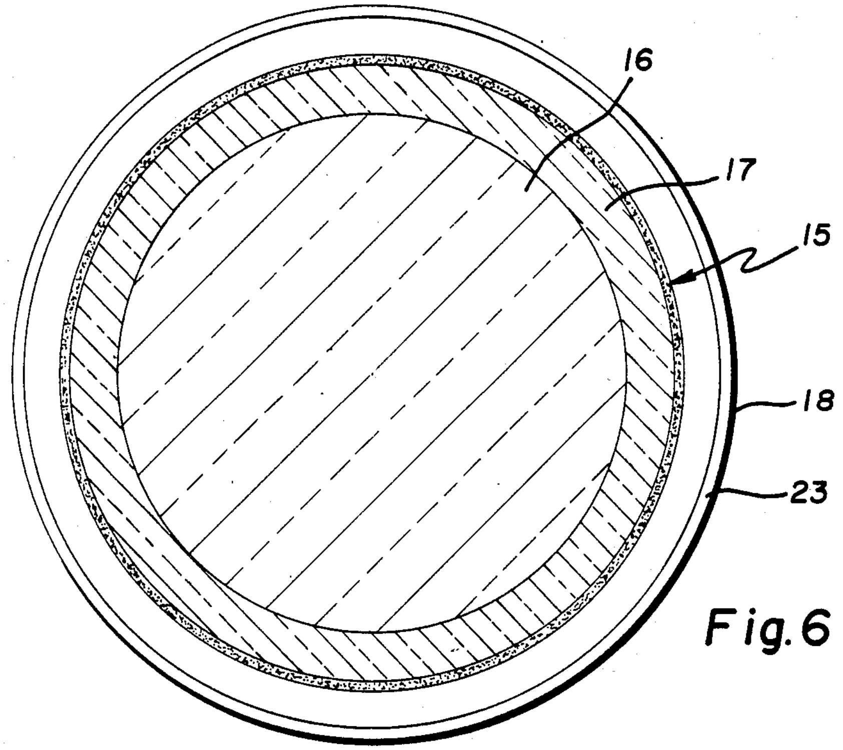
FIG. 6 is a section on line VI—VI of FIG. 2.

The main features of the preferred embodiment of the present invention are displayed in FIG. 1, in which a filter-incorporating faceplate 10 of the present invention is shown in combination with an optical imaging/detecting device 11. The faceplate is installed across the light admitting aperture 12 of the device and is provided with a detecting element 24. FIG. 1 illustrates schematically that light from the target which is aligned with the axis of the faceplate (and the device) is admitted and detected, while sufficiently off-axis optical noise, either ambient or scattered, is absorbed at the periphery of the filter-carrying faceplate.

The embodiment illustrated in FIG. 2 is essentially disk shaped. The invention may, of course, be embodied in a shallow cylinder having faces with any regular polygonal shape, or any shape that is required, in order to correspond to the aperture of the imaging device. A circular disk shape will be assumed in this disclosure for the sake of clarity and simplicity.

Although the filter-bearing faceplate is formed to be an integral article, FIG. 2 illustrates that it may be considered to be formed of a series of conceptually distinct layers: the front plate 18, the conduit 15 proper (of which only the absorbing region 17 is visible in FIG. 2), and the back plate 19. In use, a photosensitive detection element 24 is applied to the back plate.

These conceptually distinct layers are more clearly visible in FIG. 3, which is a section taken on line III—III of FIG. 2. In this figure, the conduit layer 15 is seen to be composed of a transparent core 16 of clear glass surrounded by a toroidal absorbing region 17. In the preferred embodiment the front plate/core interface 21 and the back plate/core interface 22 are non-reflecting and non-refracting. Ideally, in fact, the front plate, core, and back plate are formed as an integral body of clear glass having a uniform index of refraction.

The relation among the radii of the layers in this disk shaped embodiment is indicated diagrammatically in FIG. 2. If any other shape is employed, a similar relation would hold among the respective radial extents in any given direction.

Primarily, $R_1$, the radius of the front plate, is significantly greater than $R_2$, the radius of the conduit layer as a whole. This radius $R_2$ comprises the radius $R_3$ of the core, plus the radial width of the annular or toroidal region (See also FIG. 6.) As a result of this extension of the front plate, a shoulder 23 is formed at the edge of the filter carrying faceplate which shoulder is composed of the same material as the front plate and is continuous with the front plate.

Furthermore, the radius $R_4$ of the back plate is preferably greater than the radius $R_3$ of the core and slightly less than or equal to the radius $R_2$ of the conduit as a whole.

As a result, the free surface of the back plate presents a face of homogeneous material and uniform properties. This contrasts with arrangement in which the absorbing region extends to the free inner surface, which surface thereby presents a two-phase face of clear glass and absorbing glass.

In the preferred embodiment, all three of the front plate, core, and back plate have the same indices of refraction and of thermal expansion and are formed as an integral body, or are joined with non-reflecting non-refracting interfaces.

The conduit layer 15 comprises a core 16 and an absorbing region 17. The detailed interaction of these components may take a number of forms. FIGS. 4 and 5 illustrate two approaches to this interaction and are intended to be illustrative and not limiting.

In FIG. 4, a sample region of absorbing or "black" glass surrounds the core of the conduit layer. Most off-axis light is simply absorbed by this glass, especially if the index of the refraction of the absorbing glass is chosen to promote refraction into the absorbing region. The device is best suited to be operated well within certain predetermined operating temperature ranges. Devices employing this kind of straightforward peripheral off-axis absorption are presently known in the art.

To produce an especially complete absorption of off-axis light, the embodiment of FIG. 5 may be employed. The conduit layer in this case makes use of technology disclosed in the co-assigned and co-pending application Ser. No. 497,665 U.S. Pat. No. 4,533,210 which is hereby incorporated by reference. In particular, the absorbing region is made of a matrix having the same composition as the core, but in which are embedded fibers or pins 30 of absorbing or black glass, the fibers extending more or less radially of the axis of the conduit.

Figure 7:
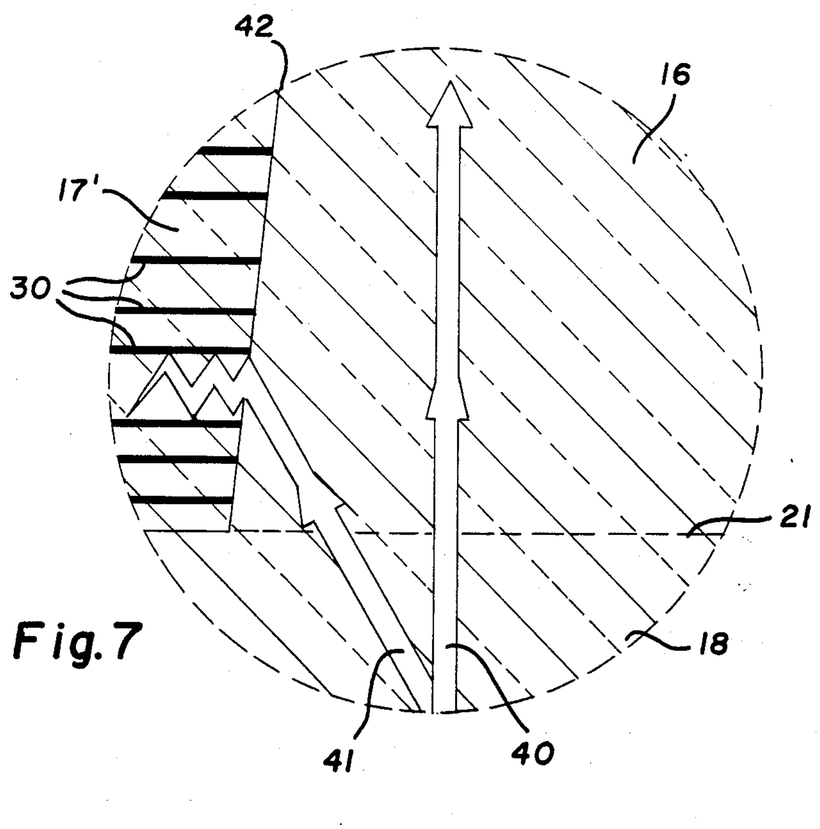
FIG. 7 is a detail of the area labeled VII of FIG. 5 showing the effect, near the periphery of a conduit according to FIG. 5, on an axial and an off-axis beam of light respectively.

As illustrated in FIG. 7, since the interface between the core glass and the matrix glass of the same composition does not involve reflection or refraction, an off-axis beam of light 41 passes through the interface 42 is trapped among the absorbing black fibers 30. There, it is reflected, refracted into the pins, and diminuated until it is totally absorbed.

On the other hand, axial light such as the beam 40 passes through the core of the conduit unhindered.

For example, such a conduit may be formed by the steps of: forming a flat sheet of glass containing parallel fibers or pins of absorbing glass, cutting the sheet in beveled strips, assembling the strips into a cylindrical configuration with the absorbing elements extending more or less radially of the axis, inserting a core of transparent glass, and fusing the assembly and core together. Using an absorbing layer which includes an absorbing region as just described not only avoids the problem of reflection at the interface when the faceplate is in use, but also minimizes the manufacturing difficulties that arise at fabricating temperatures due to differences in the indices of thermal expansion/contraction. Thus, glass matching problems are reduced or eliminated by the present invention.

The formation, use, and operation, as well as the advantages of the present invention should now be readily apparent. The various layers of the filter-carrying faceplate may be separately fabricated in the proper thickness and radius by known methods, or in the case of the fiber embedded conduit layer, by the methods disclosed in U.S. Pat. No. 4,533,210. Alternatively, the clear glass body comprising core, front plate and back plate may be formed as an integral unit; as by molding, machining, etc. In this case, the absorbing toroidal region is added subsequently such as by filling the appropriate space with molten black glass and allowing it to solidify.

The faceplate may also be formed by fusing co-axial disks without regard to radius, and thereafter shaping the faceplate to the disclosed shape by known methods.

After rough shaping, certain critical areas of the faceplate must be finely polished. In particular the free surface 25 of the back plate must be polished to receive a wafer of photosensitive material, such as gallium/arsenide semi-conductor. The polishing of this surface is very important for the proper and consistent bonding of the gallium arsenide to the free surface. The faces of prior faceplates have presented areas of both clear and absorbing glass. Since the back glass is more difficult to polish, the surface cannot be polished consistently and the result is inconsistent bonding of the semi-conductor wafer.

The surface 25 of the present invention is of the single clear glass, homogeneous and uniform in properties, and providing consistent bonds and higher yields of usable product.

The other area where polishing is critical is the shoulder 23 in approximately in the area designated 35 in FIGS. 4 and 5. It is here that an Indium seal 36 is made between the face plate 10 and the frame 37 of the optical imaging device 11, as seen in FIG. 1. Since this shoulder is formed of clear glass in the present invention, the problems of polishing are diminished are compared with prior faceplates in which the shoulder is formed of an extension of the absorbing glass region. Thus more reliable Indium seals are formed.

Moreover, the shoulder portion is integral with the front plate and the rest of the clear glass components and is not a free standing toroid. Thus it is not separated from the rest of the faceplate by material having a different coefficient of thermal expansion. Thus, neither the possibly high variations in temperature in manufacture or use nor subsequent strain of internal vacuum in a device will tend to disrupt the integrity of the faceplate according to the present invention.

Purely as an example, a small practical filter faceplate was fabricated using No. 7056 Corning brand clear glass for the transparent parts. The core of the conduit was about 95 mm in radius, with a slight (A=5°-6°) bevel outward toward the front plate and a matching bevel on the absorbing toriodal region to ease the alignment of these surfaces. The conduit layer was approximately 19 mm thick, the back plate about 4 mm thick, and the front plate about 33 mm. The shoulder formed by the extension of the front plate extended about 40 mm from the edge of the conduit as a whole.

It is apparent that minor changes may be made in the form and construction of the invention without departing from the material spirit thereof. It is not desired to confine the invention to the exact form shown herein and described but it is desired to include all such as properly come within the scope claimed.

The invention having been thus described, what is claimed a new and desired to secure by Letters Patent is:

1. An optical faceplate incorporating an off-axis filter, the faceplate comprising:
   a. a conduit layer having a clear glass core and a peripheral absorbing region, and
   b. a clear glass front plate joined to the conduit layer, having an essentially non-reflective, non-refractive interface with the core of the conduit, and extending beyond the peripheral absorbing region to form a clear glass shoulder.

2. An optical faceplate as recited in claim 1, further comprising:
   c. a clear glass back plate joined to the conduit layer, having an essentially non-reflecting, non-refracting interface with the core of the conduit, and coextensive with the conduit as a whole, whereby an inner detecting surface is formed, of uniformly clear glass.
3. An optical faceplate as recited in claim 2, wherein:
   a. said absorbing region comprises a matrix of clear glass having a plurality of absorbing fibers embedded therein, the fibers extending generally radially of the axis of the conduit.
4. An optical imaging device, comprising:
   a. a frame having a light-admitting aperture,
   b. an optical faceplate as recited in claim 2 sealed across the aperture, the faceplate having a photosensitive detecting wafer sealed to the inner detecting surface, and
   c. means for processing any image detecting by the wafer in response to admitted light.
5. An optical faceplate as recited in claim 1, wherein: said absorbing region comprises a matrix of clear glass having a plurality of absorbing fibers embedded therein, the fibers extending generally radially of the axis of the conduit.
6. An optical faceplate incorporating an off-axis filter, the faceplate comprising:
   a. a conduit layer having a clear glass core, an interface and a peripheral absorbing region, and
   b. a clear glass back plate joined to the conduit layer, having an essentially non-reflecting, non-refracting interface with the core of the conduit, the clear glass back plate extending beyond the interface between the clear glass core and the peripheral absorbing region, whereby an inner detecting surface is formed, of uniformly clear and polishable glass.
7. An optical faceplate as recited in claim 6, wherein: said absorbing region comprises a matrix of clear glass having a plurality of absorbing fibers embedded therein, the fibers extending generally radially of the axis of the conduit.

* * * * *